June 3, 1969  E. J. NITSCH ET AL  3,448,259
VEHICLE LAMP DRAIN
Filed June 21, 1967
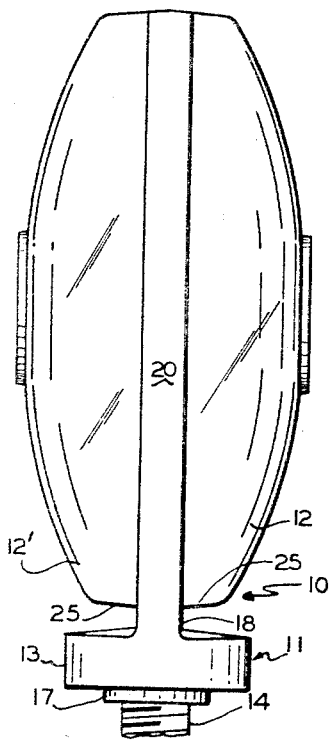
Fig. 1
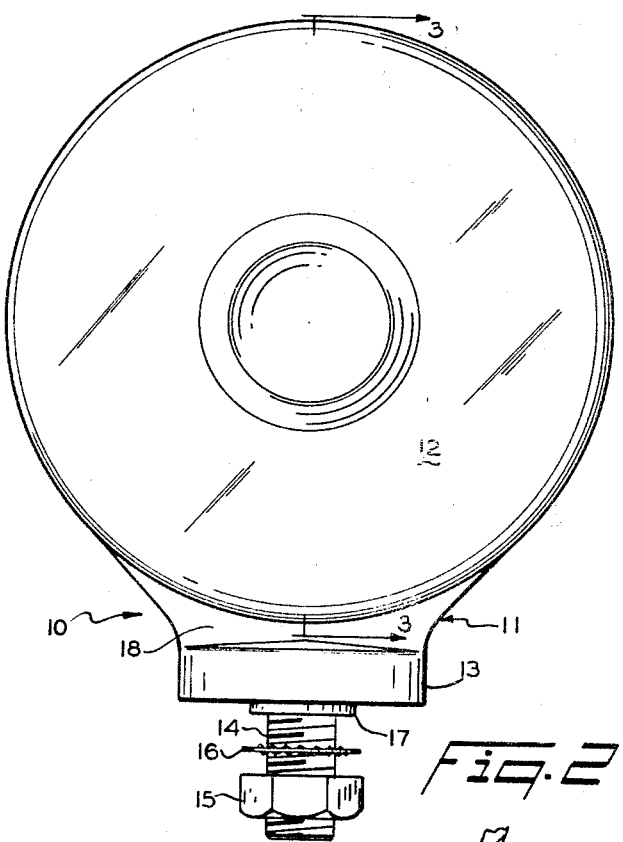
Fig. 2
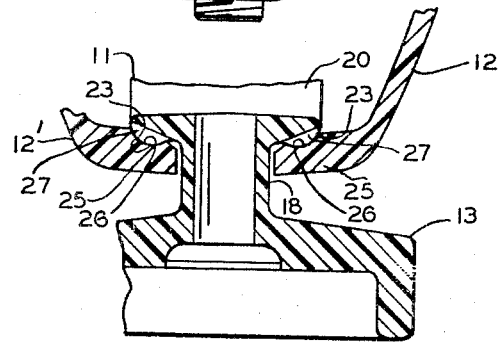
Fig. 4
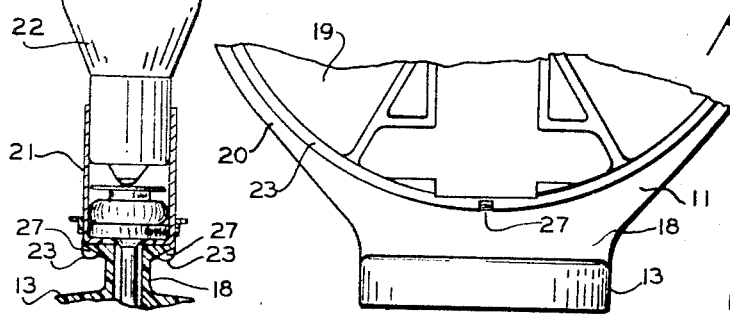
Fig. 3    Fig. 5
INVENTORS.
EDWARD J. NITSCH
ALFRED G. TIENKEN
BY 
Attys.

United States Patent Office 3,448,259
Patented June 3, 1969

3,448,259
VEHICLE LAMP DRAIN
Edward J. Nitsch, Camillus, and Alfred G. Tienken, Syracuse, N.Y., assignors to R. E. Dietz Company, Syracuse, N.Y., a corporation of New York
Filed June 21, 1967, Ser. No. 647,673
Int. Cl. B60q 1/02
U.S. Cl. 240—7.1            3 Claims

ABSTRACT OF THE DISCLOSURE

A lamp adapted to be secured to a vehicle and having a snap type lens. The lamp body has a radially projecting bead around its edge and the cupped lens has an interior groove around its edge which snaps over the bead to secure the lens to the body. The body is provided with a slot across the bead at the bottom of the lamp so that moisture within the lens can drain out through the slot.

Background of the invention

This invention relates to vehicle lamps and more particularly to those having a snap-on type lens.

Improvements in plastic molding have brought with them the development of lamps with snap-on type lenses. The plastic body of the lamp is provided with a bead therearound at the edge of the body adapted to come in contact with the lens. The plastic lens is dished or cupped so as to have an annular rim which is adapted to overlie the beaded edge of the body, the interior surface of the lens rim having a groove therearound adapted to snap into engagement with the bead.

The resilience of the plastic materials of which the body and the lens are made is sufficient to permit the snap-on engagement of the parts but is not sufficient in some cases to form a perfect seal between body and lens. As a result moisture leaks in, or condenses, behind the snap-on lens where leakage was impossible in lamps provided with rubber rings for engagement with grooves in the body and lens. Temperature and atmospheric pressure changes cause a breathing condition which sucks in and expels air between body and lens until particles of dust become lodged between bead and groove which may cause a pressure differential between exterior and interior of the lamp with possible dislodgement of the lens as a result.

Summary of the invention

To provide a drain for moisture which seeps in between body and lens and a pressure equalizing passage, the invention contemplates a slot at the bottom of the body across the bead, the slot being deeper than the portion of the bead adapted to be contacted by the overlying groove in the lens. Due to the location of the bead near the outer edge of the body it is always possible to cut or form the slot diagonally downward across the bead so that water behind the lens will drain down through the slot but will be impeded by the upwardly extending passage between the bottom of the slot and the lens.

The principal object of the invention is to provide a pressure equalizing passage and drain for water trapped in the lamp which will be concealed from view by the lens and inclined so as to minimize entry of water thereat because of the forward motion of the vehicle.

Other objects and advantages will become apparent from the following description in conjunction with the appended drawings, in which:

Brief description of the drawings

FIGURE 1 is a side elevational view of a lamp according to the invention, a portion being broken away;
FIGURE 2 is a front elevational view thereof;
FIGURE 3 is a fragmentary sectional view of the lamp body on the line 3—3 of FIGURE 2;
FIGURE 4 is an enlarged fragmentary sectional view of a portion of the body shown in FIGURE 3 with lenses attached; and
FIGURE 5 is an enlarged fragmentary front elevational view of a portion of the lamp body.

Description of the preferred embodiment

In the drawings the lamp 10 has a body 11 and two oppositely facing lamp lenses 12 and 12'. Body 11 has a base 13 provided with a downwardly projecting threaded sleeve 14 adapted to be secured to a horizontal surface of the vehicle by a nut 15 and lockwasher 16. A sealing rubber washer or grommet 17 is provided around the sleeve 14.

Above the base 13 and joined thereto by neck 18, the body has an upstanding annular fin portion 19 terminating radially in a circular flange 20 extending to either side of the fin as best seen in FIGURE 3. An appropriate bulb socket 21 is secured in the base portion 13 and a lamp bulb 22 in socket 21 extends into the central cavity of the annular fin 19.

There is a radially projecting bead 23 around the flange 20 on either side of the fin 19 adapted for securing the lenses 12 and 12' to the body.

Lenses 12 and 12' are identical except for color, it being understood that it may be advantageous to have a yellow lens facing forward of the vehicle and a red lens facing back. Each lens is cupped so as to have an annular edge 25 adapted to overlie the body flange 20 and the inner surface of the lens edge 25 is grooved at 26 so as to engage with the bead 23 when the lens is snapped into engagement with the body.

In order to provide a drain for air and moisture which may form by condensation or leak in between lens and body a slot 27 is cut or formed extending inward and diagonally down across the bead 23 on each side of flange 20 at the bottom of the body 11. The slot 27 is narrow but is deeper than the portion of bead 23 adapted to be contacted by the groove 26 of the lens when the lens is snapped into position, as may be clearly seen in FIGURE 4.

When the lens is in place this drainage slot is concealed and, since the slot extends downwards, entrance of moisture through the slot is resisted. Also it will be apparent that when lamp 10 is secured to a vehicle with one lens facing forward and the other back, one slot 27 is protected by its overlying lens from currents of air caused by the forward motion of the vehicle. The other slot 27 is protected from the currents by the portion 18 of body 11 joining base 13 and flange 20.

As will be apparent to those familiar with the art, the invention may be embodied in other specific forms without departing from the spirit or essential characteristics thereof. The embodiment disclosed therefore is to be considered in all respects as illustrative, rather than restrictive, the scope of the invention being indicated by the appended claims.

What is claimed is:

1. In a lamp having a body adapted to be secured to a vehicle and a snap-type lens, the body having a bead therearound and the lens having a cooperating groove therearound receiving the bead for securing the lens to the body, the improvement comprising: the body having a slot across the bead at a location adapted to be at the bottom of the lens when the body is secured to the vehicle, the slot being deeper than that portion of the bead in contact with the lens groove.

2. A vehicle signal lamp having a body adapted to be secured to a vehicle in a vertically disposed position, and a lens of the snap-on type adapted to also be vertically disposed when secured to the body, the body having a projecting bead therearound, the lens being cupped and having a cooperating groove around the inner edge thereof snapped over the bead for engagement with the body, the body having a diagonally disposed narrow slot across the bead at the bottom of the body, the slot being deeper than the portion of the bead engaged by the lens groove whereby moisture entrapped inside the affixed lens drains through the slot.

3. A vehicle lamp having an annular body supported at its bottom on a radially projecting base adapted to be secured to the vehicle, each side of the body having a radially projecting bead therearound, a lens for each side of the body, each lens being cupped and having an annular edge portion overlying one side of the body, the edge portion being interiorly grooved for snap-on engagement with the body bead, the body at its bottom having a narrow slot across each bead, the slot being deeper than the portion of the bead engaged by the lens groove, whereby moisture entrapped inside the affixed lenses drains through the slots.

References Cited
UNITED STATES PATENTS

| | | | |
|---|---|---|---|
| 2,814,720 | 11/1957 | Martin | 240—41.55 |
| 2,903,570 | 9/1959 | Worden | 240—8.2 |
| 3,184,590 | 5/1965 | Nagel | 240—8.3 |

NORTON ANSHER, *Primary Examiner.*

DAVID S. STALLARD, *Assistant Examiner.*

U.S. Cl. X.R.

220—82